US012576652B2

(12) United States Patent
Wu

(10) Patent No.: US 12,576,652 B2
(45) Date of Patent: Mar. 17, 2026

(54) ULTRAVIOLET (UV) LIGHT-EMITTING DIODE (LED) INKJET PRINTER

(71) Applicant: Procolored Technology Inc, Pico Rivera (CA)

(72) Inventor: Jiangyu Wu, Shenzhen (CN)

(73) Assignee: Procolored Technology Inc, Pico Rivera, CA (US)

( * ) Notice: Subject to any disclaimer, the term of this patent is extended or adjusted under 35 U.S.C. 154(b) by 152 days.

(21) Appl. No.: 18/491,402

(22) Filed: Oct. 20, 2023

(65) Prior Publication Data

US 2024/0042776 A1 Feb. 8, 2024

(30) Foreign Application Priority Data

Dec. 9, 2022 (CN) ........................ 202223325783.X

(51) Int. Cl.
*B41J 11/70* (2006.01)

(52) U.S. Cl.
CPC .................................. *B41J 11/706* (2013.01)

(58) Field of Classification Search
CPC ...... B41J 11/706; B41J 15/046; B41J 13/106; B26D 1/065
See application file for complete search history.

(56) References Cited

U.S. PATENT DOCUMENTS

2018/0304486 A1* 10/2018 Nakatsu .................. B26D 5/06
2019/0352526 A1* 11/2019 Fujii ......................... B41J 2/01

FOREIGN PATENT DOCUMENTS

CN 114454508 A 5/2022
CN 115042521 A 9/2022

* cited by examiner

*Primary Examiner* — Justin Seo

(57) ABSTRACT

An ultraviolet (UV) light-emitting diode (LED) inkjet printer includes a printing member for performing printing on a surface of a substrate, a carrying member configured to continuously pull the substrate so that the substrate can be conveyed forward from the printing member, a supporting platform and a cutting member. The supporting platform is provided in front of the carrying member to support the substrate conveyed from the carrying member. The cutting member is provided above the supporting platform, and includes a guide rail and a cutter. The guide rail extends in a direction orthogonal to a direction in which the substrate is conveyed, and extends at least across an area of the supporting platform for supporting the substrate. The cutter is carried on the guide rail, and is movable along the guide rail. The cutter is configured to abut against and cut the substrate on the supporting platform.

9 Claims, 6 Drawing Sheets

ULTRAVIOLET (UV) LIGHT-EMITTING DIODE (LED) INKJET PRINTER

CROSS-REFERENCE TO RELATED APPLICATIONS

This application claims the benefit of priority from Chinese Patent Application No. 202223325783.X, filed on Dec. 9, 2022. The content of the aforementioned application, including any intervening amendments made thereto, is incorporated herein by reference in its entirety.

TECHNICAL FIELD

This application relates to printers, more particularly to an ultraviolet LED inkjet printer (UV printer).

BACKGROUND

Ultraviolet LED inkjet printer (UV printer) is a plate-free full-color digital printer that is not limited by materials. The UV printer can perform color printing on a substrate, such as T-shirt, glass, plate and film. The UV printer can print required graphics on the substrate to form a pattern.

In the prior art, when printing on a release-liner substrate, the substrate with a shape like A4 or A5 paper is placed on a printing platform for printing, and is removed after printing, and then a new substrate is loaded, leading to a low substrate replacement efficiency.

In view of this, some roll substrates have been developed for UV printers. However, considering that the roll substrates are continuously fed, they need to be cut off after the required graphics are printed. In the prior art, the printed pattern is transferred mainly by a transport roller arranged in front of the UV printer, and then is manually cut by scissors or knives, resulting in inconvenient operation and poor cutting accuracy.

SUMMARY

An object of this application is to provide an ultraviolet LED inkjet printer (UV printer) which can simply and accurately cut off substrates to solve the technical problems in the prior art.

Technical solutions of the present disclosure are described as follows.

This application provides an ultraviolet LED inkjet printer (UV printer), comprising:

a printing member;

a carrying member;

a supporting platform; and a cutting member;

wherein the printing member is configured to perform printing on a surface of a substrate; the carrying member is configured to continuously pull the substrate so that the substrate is conveyed forward from the printing member; the supporting platform is provided in front of the carrying member, and is configured to support the substrate conveyed from the carrying member; the cutting member is provided above the supporting platform; the cutting member is provided with a guide rail and a cutter; the guide rail is configured to extend in a direction orthogonal to a direction in which the substrate is conveyed, and at least extend across an area of the supporting platform for supporting the substrate; and the cutter is provided on the guide rail and is movable along the guide rail, and the cutter is configured to abut against the substrate on the supporting platform and cut the substrate.

The benefits of the present disclosure are described as follows: the UV printer according to the present disclosure can cut off the substrate simply and accurately.

In an embodiment, the guide rail is swingably mounted on the supporting platform so that the cutter abuts against or leaves from the substrate.

In an embodiment, two ends of the guide rail along a length direction are articulatedly with lugs arranged on two sides of the supporting platform, respectively.

In an embodiment, the guide rail is provided with a pressing portion. When the guide rail swings to a position where the cutter abuts against the substrate, the substrate is pressed by the pressing portion onto the supporting platform.

In an embodiment, the supporting platform is provided with a supporting portion to support the substrate. The supporting portion protrudes from a supporting surface of the supporting platform and the pressing portion is configured to press the substrate onto the supporting portion.

In an embodiment, the supporting surface of the supporting platform is provided with a support plate, and the supporting portion is provided on an upper surface of the support plate.

In an embodiment, the cutter abuts against the substrate in front of the pressing portion, and the cutter is not in contact with the supporting surface of the supporting platform.

In an embodiment, the cutter includes a mounting base and a blade, and the cutter is slidably amounted on the guide rail through the mounting base.

In an embodiment, the guide rail is provided with a guide groove extending in the direction orthogonal to the direction in which the substrate is conveyed; and the mounting base is accommodated in the guide groove, and is slidable in the guide groove.

In an embodiment, the carrying member includes a first clamping roller and a second roller; and the first clamping roller and the second clamping roller are opposite to each other in a vertical direction, and are configured to clamp the substrate.

DETAILED DESCRIPTION OF EMBODIMENTS

Figure 1:
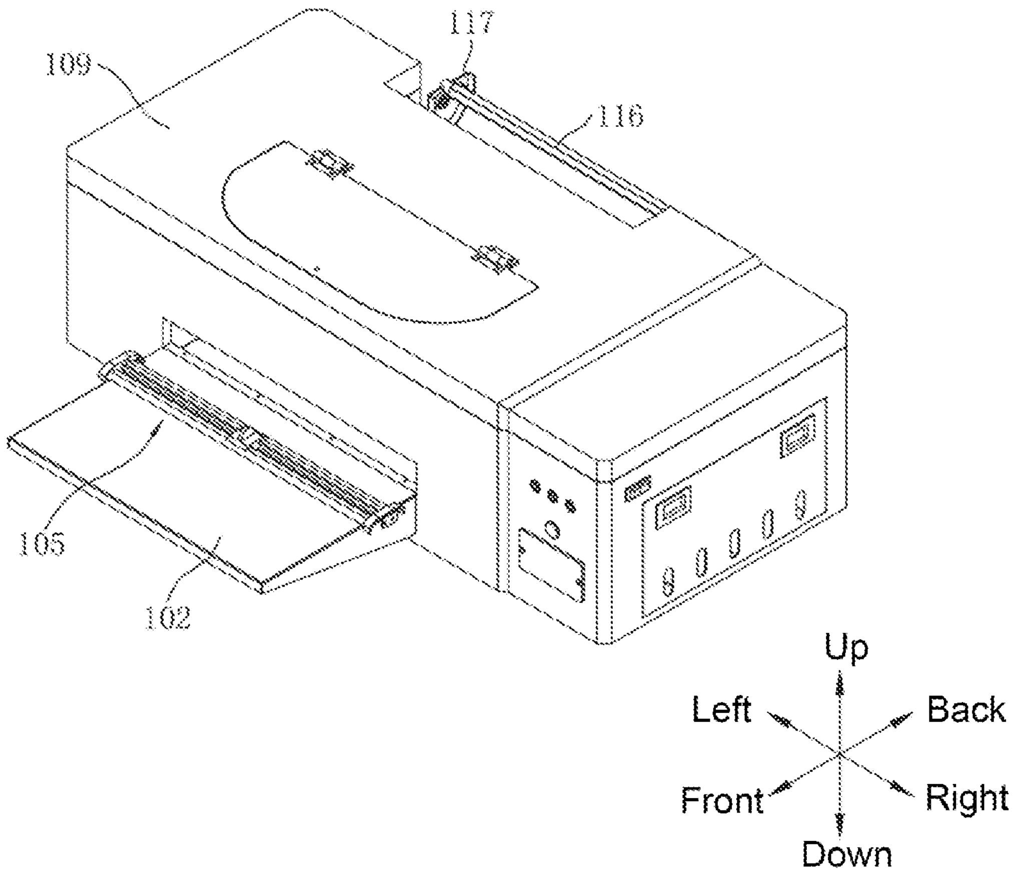
FIG. 1 is a perspective view of a UV printer according to an embodiment of the present disclosure viewed from the front.

The present disclosure will be further described below with reference to accompanying drawings and embodiments to facilitate understanding of the disclosure. Presented in the drawings are merely some embodiments of the disclosure. Various embodiments made by those of ordinary skill in the art without paying creative labor based on the present disclosure shall fall within the scope of the present disclosure.

In the description of this embodiment, the orientation or position relationship indicated by the terms “up”, “down”, “front”, “back”, “left”, and “right” is based on the orientation or position relationship shown in the accompanying drawings. These terms are only for facilitating and simplifying description rather than indicting or implying that the referred devices or components must have a particular orientation or be constructed and operated in a particular orientation. Therefore, these terms should not be considered as the limitation of this application.

In the description of this embodiment, if a component is said to be “arranged”, “fixed”, “connected”, and “mounted” to another component, it can be directly arranged, fixed and connected to another component or indirectly arranged, fixed, connected and mounted to another component. Term “several” used herein refers to one or more, and term “a plurality of” used herein refers to two or more. Terms “greater than”, “less than” and “over” shall be understood as not including the number itself. Terms “above”, “below” and “within” shall be understood as including the number itself. The terms “first” and “second” are only used for distinguishment, and should not be understood as indicating or implying relative importance or implicitly specifying the number of technical features indicated or implicitly specifying the sequence of technical features indicated.

Figure 2:
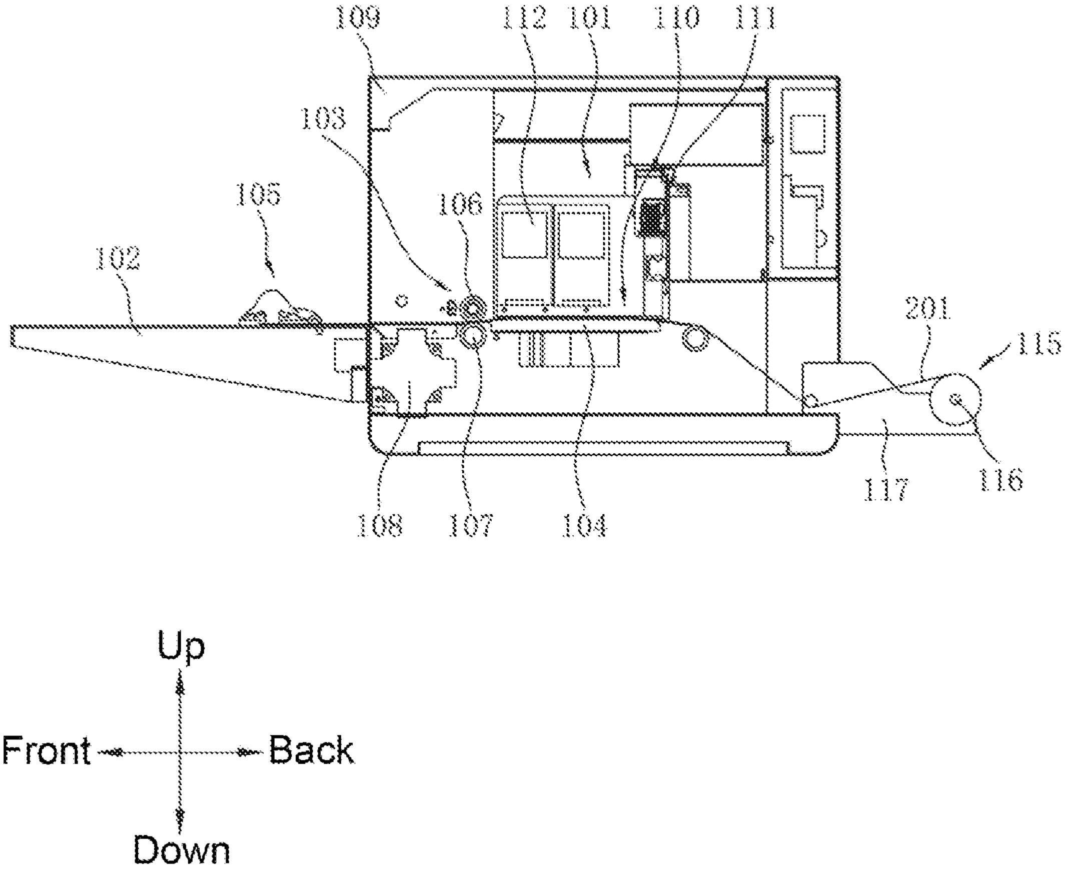
FIG. 2 is a partially-sectional view of a base of the UV printer in FIG. 1.
Figure 3:
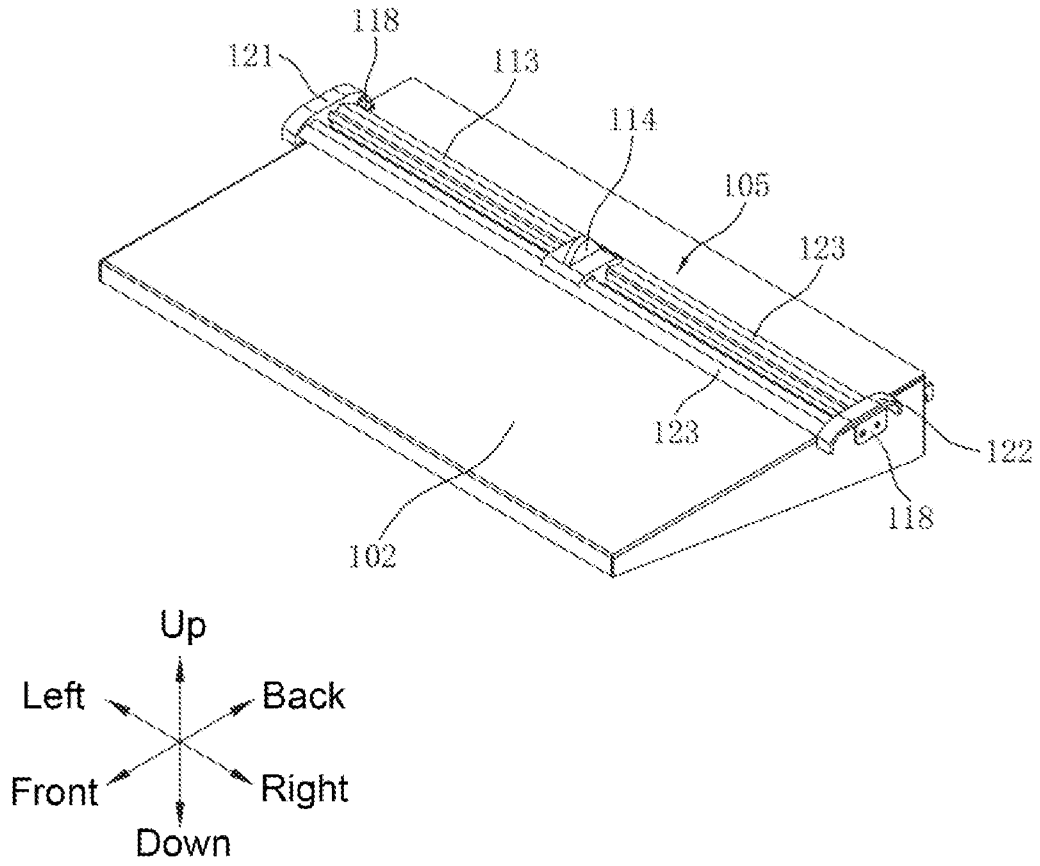
FIG. 3 is a perspective view of a supporting platform and a cutting member in FIG. 1.
Figure 4:
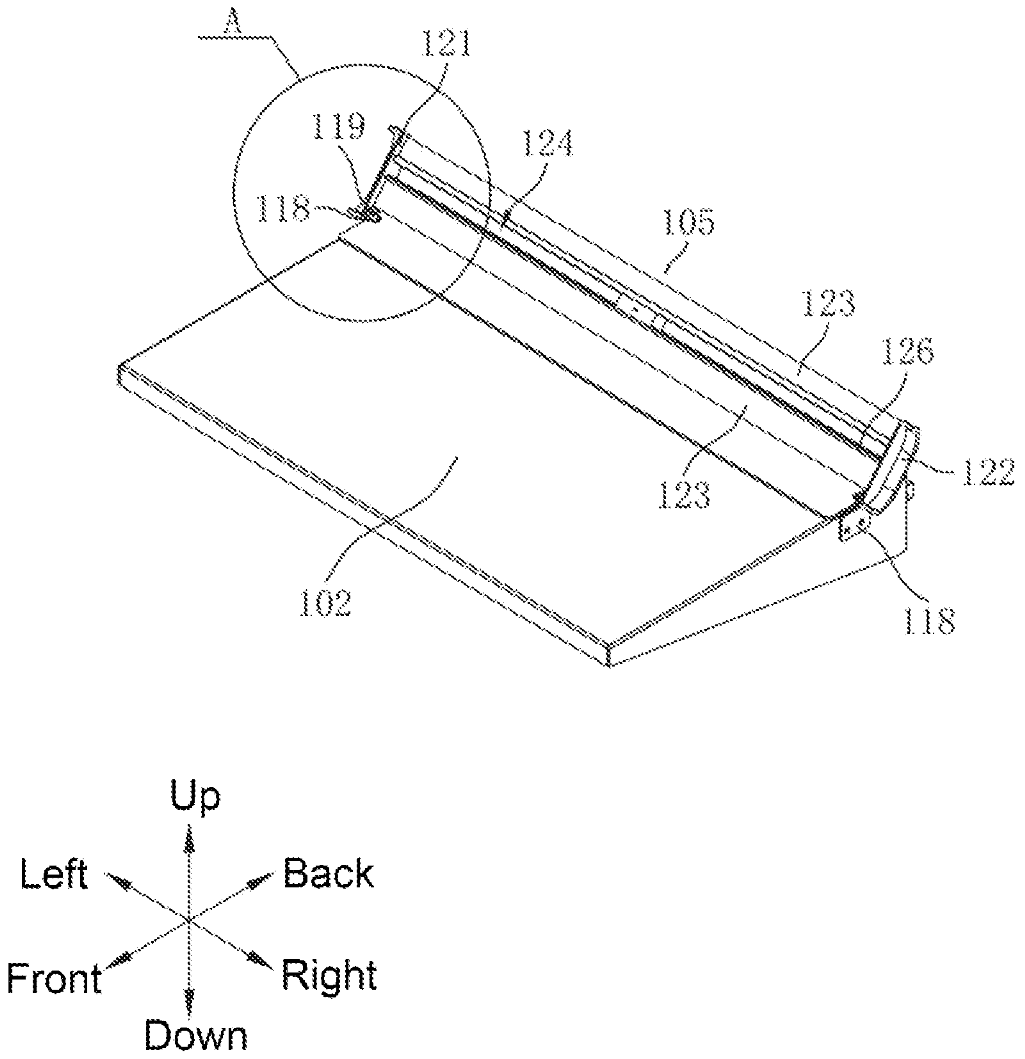
FIG. 4 is a perspective view of the supporting platform and the cutting member in FIG. 1 in another state.
Figure 6:
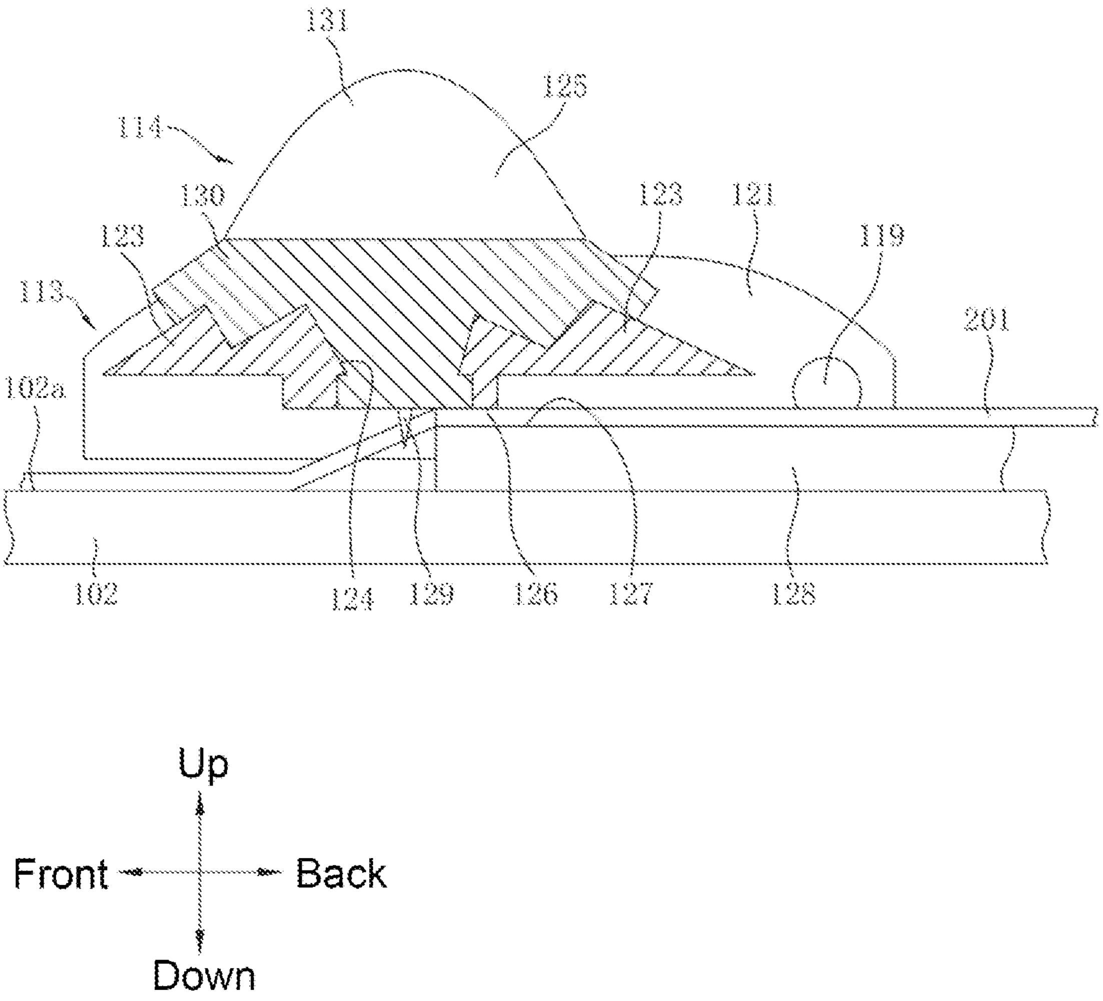
FIG. 6 schematically shows the cutting member in a cutting state according to an embodiment of the present disclosure.

FIG. 1 is a perspective view of an ultraviolet (UV) light-emitting diode (LED) inkjet printer viewed from the front. FIG. 2 is a partially-sectional view of a base 109 of the UV printer in FIG. 1. For the purpose of illustration, in FIG. 2, there is no section lines drawn on a position where the base 109 is sectioned. FIG. 3 is a perspective view of a cutting member 105 in cutting state. FIG. 4 is a perspective view of the cutting member 105 in another state. FIG. 6 schematically shows the cutting member 105 in a cutting state. In addition, in FIG. 6, part of a guide rail 113 is cut and a cut part is represented by the hatch for facilitation of schematic.

Referring to FIGS. 1-6, especially FIGS. 1-3, a UV printer (printer) of this embodiment includes a printing member 101, a carrying member 103, a supporting platform 102 and the cutting member 105. The printing member 101 is configured to print a surface of a substrate 201. The carrying member 103 is configured to continuously pull the substrate 201 so that the substrate 201 is conveyed forward from the printing member 101. The supporting platform 102 is provided in front of the carrying member 103 to support the substrate 201 conveyed from the carrying member 103. The cutting member 105 is provided above the supporting platform 102. The cutting member 105 is provided with a guide rail 113 and a cutter 114. The guide rail 113 is configured to extend in a direction orthogonal (a left-right direction in the accompanying drawings) to a direction in which the substrate 201 is conveyed, and at least extend across an area of the supporting platform 102 for supporting the substrate 201. The cutter 114 is provided on the guide rail 113 and is movable along the guide rail 113, and the cutter 114 is configured to abut against the substrate 201 on the supporting platform 102 and cut the substrate 201.

The UV printer provided herein can cut off the substrate 201 simply and accurately. In front of the carrying member 103 is provided with the supporting platform 102 to support the substrate 201, and above the supporting platform 102 is provided with the guide rail 113 and the cutting member 105 of the cutter 114. In this way, when a printed substrate 201 is conveyed from the supporting platform 102, the cutter 114 abuts against the substrate 201 and moves along the guide rail 113 to cut off the substrate 201. This operation is convenient and can cut off the printed substrate 201 simply and accurately.

Referring to FIG. 2, the UV printer can be applied to a roll-shaped substrate 201. The printer includes the base 109. For example, the base 109 can be made in box-shaped by sheet metal processing. A middle in the left-right direction of the base 109 is provided with a printing area 110, and a printing platform 104 of the printing member 101 is arranged in the printing area 110. The printing area 110 is open in a front-back direction to facilitate feeding of the substrate 201. The printing member 101 can include a driving device 111 driven in the left-right direction. A print head 112 for printing on the substrate 201 (such as printing UV transfer sticker or other patterns) is provided on the driving device 111. While the substrate 201 is continuously conveyed, the driving device 111 can drive the print head 112 move in the left-right direction, in this way, a required UV transfer sticker or pattern is printed on the substrate 201 placed on the printing platform 104. A structure of the driving device 111 is not limited as long as it can drive the print head 112. For example, the driving device 111 can be a commonly known linear driving device which is combined by a motor and a transmission device and can move linearly.

In an embodiment, the carrying member 103 can be arranged in front of the printing platform 104, and the carrying member 103 is configured to continuously convey the substrate 201 which is passed through the printing platform 104. It should be noted that the carrying member 103 is arranged in front of the printing member 101, which should be understood that the carrying member 103 is arranged in front of the printing member 101 along a handling direction of the substrate 201. In this embodiment, the carrying member 103 can be arranged in directly front of the printing member 101 as an independent assembly. In addition, the carrying member 103 can also be an assembly combined with the printing member 101. For example, in this embodiment, the printing member 101 can be a print module which is removed from an existing and publicly known printer for secondary use. The print module has functions of printing and handling at the same time.

In an embodiment, the carrying member 103 includes a first clamping roller 106 and a second clamping roller 107. The first clamping roller 106 and the second clamping roller 107 are opposite in an up-down direction and clamp the substrate 201. The first clamping roller 106 is arranged above the second clamping roller 107. Two axial ends of the first clamping roller 106 are rotationally mounted on a left side and a right side of the printing area 110 of the base 109 respectively. The first clamping roller 106 is driven by a commonly known driving device 108, such as a motor. Therefore, when the driving device 108 drives the first clamping roller 106, the first clamping roller 106 and the second clamping roller 107 can pull the substrate 201 continuously convey forward. In an embodiment, the supporting platform 102 is mounted in front of the base 109 and is connected to an open portion of the base 109. For example, the supporting platform 102 can be formed by bending a sheet material, such as stainless steel, or by processing plate, such as aluminum alloy. The supporting platform 102 is removably mounted in front of the base 109. A width of the left-right direction of the supporting platform 102 is greater than a width of the substrate 201. In this way, the substrate 201 pulled forward by the carrying member 103 can be supported on the supporting platform 102.

Figure 5:
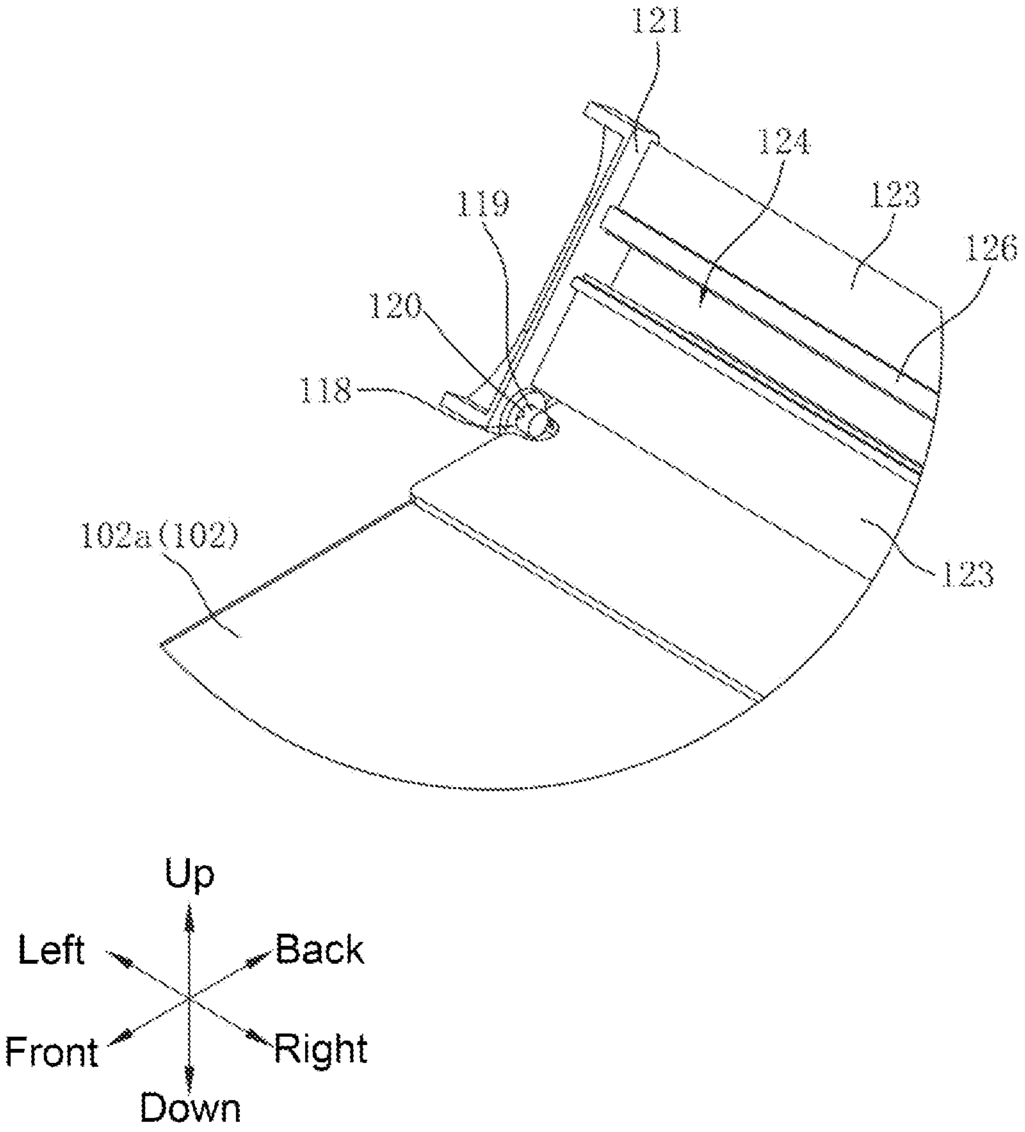
FIG. 5 is an enlarged view of portion "A" in FIG. 4.

Referring to the FIGS. 3-5, in an embodiment, the guide rail 113 of the cutting member 105 can be swingably amounted on the supporting platform 102, so that the cutter 114 abuts against the substrate 201 or leaves from the substrate 201. In addition, the guide rail 113 can be configured to cross a whole supporting platform 102 in the left-right direction. When the substrate 201 is not cut, the cutter 114 leaves from the base 109 to avoid the cutter 114 from blocking the substrate 201 when it is conveyed forward. When the substrate 201 needs to be cut off, the cutter 114 is close to and abuts against the substrate 201 to cut off the substrate 201. The guide rail 113 drives the cutter 114 to abut against or leave from the substrate 201 by swinging, which is simple in structure and is easy for manual operation.

In an embodiment, two ends of the guide rail 113 along a length direction are articulated with lugs 118 arranged on two sides of the supporting platform 102, respectively. In an embodiment, the two ends of the guide rail 113 along the length direction are each provided with an articulated shaft 119 respectively, and two lugs 118 are provided on the two sides of the supporting platform 102 along the left-right direction relative to the articulated shaft 119 respectively. The lugs 118 are each provided with a supported hole 120, and the supported hole 120 is higher than a supporting surface 102*a* of the supporting platform 102 in the up-down direction. The guide rail 113 is supported on the two lugs 118 by two articulated shafts 119, in this way, the guide rail 113 can swing relative to the supporting platform 102. When the supporting platform 102 is conveying the substrate 201, the guide rail 113 swings upward (swinging counterclockwise in the accompanying drawings), so that the cutter 114 mounted on the guide rail 113 is far away from the supporting platform 102, in this way, the cutter 114 leaves from the substrate 201. When the substrate 201 needs to be cut off, the guide rail 113 swings downward, so that the cutter 114 mounted on the guide rail 113 is close to the supporting platform 102, in this way, the cutter abuts against the substrate 201.

Referring to FIG. 6 in combination with FIGS. 4-5, the guide rail 113 is integrally formed by plastic material with a certain elasticity, such as nylon, PTFE and PMMA. The guide rail 113 is provided with a first end portion 121 and a second end portion 122 on the two ends of the guide rail 113 in the length direction. The first end portion 121 and the second end portion 122 are each provided with a connecting rod 123 along the length direction. The number of the connecting rod is two. The first end portion 121 and the second end portion 122 are each provided with the articulated shaft 119 respectively. The connecting rod 123 is configured to extend along the left-right direction. Besides, the connecting rod 123 is separated by a gap between each other, which forms a guide groove 124 extending along a length direction of the guide rail 113 and the left-right direction in the accompanying drawings. When the guide rail 113 is mounted on the supporting platform 102, the guide groove 124 is orthogonal to a direction in which the substrate 201 is conveyed out (the front-back direction). A shape of the guide groove 124 is not specially limited, as long as the guide groove 124 is fit with a mounting base 125 (mentioned below) of the cutter 114 so that the mounting base 125 can be at least partially accommodated in the guide groove 124 and be smoothly slid along the guide groove 124. The shape of the guide groove 124 can be T-shaped, V-shaped, trapezoid, rectangle or combination thereof. When the guide rail 113 is mounted or removed, the two articulated shafts 119 are inserted in or removed from the supported hole 120 by elastic deformation of the guide rail 113. When the mounting base 125 of the cutter 114 is mounted or removed, the mounting base 125 is mounted or removed by elastic deformation of two connecting rods 123 roughly in a middle of the length of the guide rail 113. In this way, it's simple to mount or remove the guide rail 113 relative to the supporting platform 102 and mount and remove the mounting base 125 of the cutter 114 relative to the guide rail 113.

The guide rail 113 is provided with a pressing portion 126, when the guide rail 113 swings to a position where the cutter 114 abuts against the substrate 201, the substrate 201 is pressed by the pressing portion 126 onto the supporting platform. In an embodiment, the pressing portion 126 is a pressing surface formed at a distal end of the connecting rod 123. When the guide rail 113 swings to a position relative to the supporting surface 102*a* of the supporting platform 102, the pressing portion 126 abuts against the supporting platform 102. When the substrate 201 is supported on the supporting surface 102*a* of the supporting platform 102, the substrate 201 is pressed by the pressing portion 126 onto the supporting surface 102*a* of the supporting platform 102. In this way, the substrate 201 is cut off in pressed state, which can improve accuracy of cutting off the substrate 201.

In addition, in order to avoid the cutter 114 scraping the supporting surface 102*a* of the supporting platform 102 as much as possible, the supporting platform 102 is provided with a supporting portion 127 to support substrate 201. The supporting portion 127 protrudes from a supporting surface of the supporting platform 102, and the pressing portion 126 is configured to press the substrate 201 onto the supporting portion 127. For example, in the guide rail 113, only the pressing surface at a back side of the connecting rod 123 abuts against the supporting portion 127 and presses the substrate 201 onto the supporting portion 127. The cutter 114 is located between the two connecting rods 123, which is located behind the guide rail 113 and is in front of the connecting rod 123. Therefore, the cutter 114 abuts against the substrate 201 in front of the pressing portion 126, and the cutter 114 is not in contact with the supporting surface 102*a* of the supporting platform 102. In this embodiment, the cutter 114 protrudes downward relative to the supporting portion 127 and does not abut against the supporting surface 102*a* of the supporting platform 102. In this way, the cutter 114 is avoid from scraping the supporting platform 102.

The form of the supporting portion 127 is not limited. For example, the supporting surface 102*a* of the supporting platform 102 is provided with a support plate 128, and the supporting portion 127 is provided on an upper surface of the support plate 128, that is, the substrate 201 is supported by the support plate 128 provided on the supporting surface 102*a* of the supporting platform 102 behind the cutter 114. In this embodiment, a step is formed between the support plate 128 and the supporting platform 102. The substrate 201 conveyed by the carrying member 103 is cut off at a front edge of the step. In this way, a sliding of the cutter 114 is guided to a certain extent to restrain a front-back swing of the cutter 114 through the step.

As described above, the cutter 114 is slidably mounted on the guide rail 113 through the mounting base 125. In an embodiment, the cutter 114 includes the mounting base 125 and a blade 129 mounted on the mounting base 125. The mounting base 125 is formed by plastic which is harder than materials of the guide rail 113, such as epoxy resin and polyformaldehyde. For example, the blade 129 can be mounted on the mounting base 125 by insert molding. The mounting base 125 is provided with a sliding part 130 fitting a shape of the guide groove 124, and an upper part of the sliding part 130 is provided with a handle part 131. The blade 129 is provided at a lower part of the sliding part 130. In this way, the cutter 114 is easily formed.

In addition, the embodiments above describe an example that the supporting portion 127 protrudes on the supporting surface 102*a* of the supporting platform 102, so that the cutter 114 is avoided from scraping an upper surface of the supporting platform 102 as much as possible. But it is not limited to that. For example, the supporting surface 102*a* of the supporting platform 102 can be provided with a slit (no figure) for avoiding the cutter 114 instead of a protruding supporting portion 127.

In addition, in an embodiment, the UV printer includes a first holding portion 115 which is configured to hold the substrate 201. The first holding portion 115 is provided behind and below the printing platform 104. In order to install the substrate 201 easily, the first holding portion 115 includes a first bracket 117 and a support shaft 116. The first bracket 117 includes a pair of first brackets 117. The pair of first brackets 117 is mounted relative to each other behind the base 109 along the left-right direction and is configured to extend beyond the base 109. The support shaft 116 is removably supported on the first bracket 117, and rotationally supports the substrate 201. For example, when installing, the support shaft 116 is inserted in a roll of the substrate 201, then the support shaft 116 is placed on the first bracket 117.

The specific technical features described in the above embodiments can be combined in any ways in the absence of contradiction. In order to avoid unnecessary repetition, other possible combinations are not described herein.

Described above are only several embodiments of the present disclosure, and are not intended to limit the disclosure. Any modifications or equivalent replacements made by those skilled in the art without departing from the scope of the present disclosure shall fall within the scope of the present disclosure defined by the appended claims.

What is claimed is:

1. An ultraviolet (UV) light-emitting diode (LED) inkjet printer, comprising:

a printing member;

a carrying member;

a supporting platform; and a cutting member;

wherein the printing member is configured to perform printing on a surface of a substrate; the carrying member is configured to continuously pull the substrate so that the substrate is conveyed forward from the printing member; the supporting platform is provided in front of the carrying member, and is configured to support the substrate conveyed from the carrying member; and the cutting member is provided above the supporting platform;

the cutting member comprises a guide rail and a cutter; the guide rail is configured to extend in a direction orthogonal to a direction in which the substrate is conveyed, and at least extend across an area of the supporting platform for supporting the substrate; the cutter is provided on the guide rail, and is movable along the guide rail; and the cutter is configured to abut against the substrate on the supporting platform and cut the substrate; and the guide rail is swingably mounted on the supporting platform, so that the cutter abuts against or leaves from the substrate;

the guide rail is provided with a pressing portion; when the guide rail swings to a position where the cutter abuts against the substrate, the substrate is pressed by the pressing portion onto the supporting platform; and the supporting platform is provided with a supporting portion to support the substrate; the supporting portion protrudes from a supporting surface of the supporting platform, wherein the supporting surface of the supporting platform is configured to support the substrate along a conveying direction of the substrate; and the pressing portion is configured to press the substrate onto an upper surface of the supporting portion.

2. The UV LED inkjet printer of claim 1, wherein two ends of the guide rail along a length direction are articulatedly connected with lugs arranged on two sides of the supporting platform, respectively.

3. The UV LED inkjet printer of claim 1, wherein the supporting surface of the supporting platform is provided with a support plate; and the supporting portion is provided on an upper surface of the support plate.

4. The UV LED inkjet printer of claim 1, wherein the cutter abuts against the substrate in front of the pressing portion, and the cutter is not in contact with the supporting surface of the supporting platform.

5. The UV LED inkjet printer of claim 1, wherein the cutter comprises a mounting base and a blade mounted on the mounting base; and the cutter is slidably mounted on the guide rail through the mounting base.

6. The UV LED inkjet printer of claim 5, wherein the guide rail is provided with a guide groove extending in the direction orthogonal to the direction in which the substrate is conveyed; and the mounting base is accommodated in the guide groove, and is slidable in the guide groove.

7. The UV LED inkjet printer of claim 1, wherein the carrying member comprises a first clamping roller and a second clamping roller; and the first clamping roller and the second clamping roller are opposite to each other in a vertical direction, and are configured to clamp the substrate.

8. The UV LED inkjet printer of claim 1, wherein the supporting surface of the supporting platform is provided with an avoidance slit corresponding to the cutter.

9. The UV LED inkjet printer of claim 3, wherein a length of the support plate along the conveying direction of the substrate is smaller than a length of the supporting surface of the supporting platform; and a step structure is formed between the support plate and an area of the supporting platform not covered by the support plate.

* * * * *